(12) United States Patent
Terasaki (10) Patent No.: US 10,606,153 B2
(45) Date of Patent: Mar. 31, 2020

(54) PROJECTOR

(71) Applicant: SONY CORPORATION, Tokyo (JP)

(72) Inventor: Kazuya Terasaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/077,620

(22) PCT Filed: Feb. 6, 2017

(86) PCT No.: PCT/JP2017/004233
§ 371 (c)(1),
(2) Date: Aug. 13, 2018

(87) PCT Pub. No.: WO2017/159113
PCT Pub. Date: Sep. 21, 2017

(65) Prior Publication Data
US 2019/0072837 A1 Mar. 7, 2019

(30) Foreign Application Priority Data
Mar. 18, 2016 (JP) .................................. 2016-055322

(51) Int. Cl.
*G03B 21/14* (2006.01)
*G03B 21/00* (2006.01)
(Continued)

(52) U.S. Cl.
CPC ....... *G03B 21/005* (2013.01); *G02B 27/0955* (2013.01); *G03B 21/16* (2013.01);
(Continued)

(58) Field of Classification Search
CPC .... G03B 21/14; G03B 21/005; G03B 21/006; G03B 21/008; G03B 21/20; G03B 21/16
See application file for complete search history.

(56) References Cited

U.S. PATENT DOCUMENTS 5,347,324 A * 9/1994 Sasaki .................. H04N 5/7441
348/789
8,882,277 B2 * 11/2014 Fujioka .............. G03B 21/2093
353/119
(Continued)

FOREIGN PATENT DOCUMENTS

JP 2001-183746 A 7/2001
JP 3092161 U 12/2002
(Continued)

OTHER PUBLICATIONS

Extended European Search Report dated Feb. 11, 2019 in the corresponding European Application No. 17766121.2.
(Continued)

*Primary Examiner* — William C. Dowling
(74) *Attorney, Agent, or Firm* — Oblon, McClelland, Maier & Neustadt, L.L.P.

(57) ABSTRACT

To improve general versatility by being capable of using a different kind of light source as well as to improve the maintainability.
Included is an optical unit including an optical system including a modulator; a signal unit that sends a signal to the modulator; a light source block including a light source that emits light, a lens that allows the light emitted from the light source to enter the optical unit, and a case including the light source inside; a power source block for light source that supplies electric power to the light source; a power source unit that supplies electric power to the signal unit and the power source block for light source; and an outer casing in which the optical unit, the signal unit, the power source unit, the light source block, and the power source block for light source are arranged, and the light source block is replaceable with a different kind of light source block including a different kind of light source.

8 Claims, 7 Drawing Sheets

(51) Int. Cl.
*G03B 21/16* (2006.01)
*G03B 21/20* (2006.01)
*G02B 27/09* (2006.01)

(52) U.S. Cl.
CPC ..... *G03B 21/2006* (2013.01); *G03B 21/2013* (2013.01); *G03B 21/2026* (2013.01); *G03B 21/2033* (2013.01)

(56) References Cited

U.S. PATENT DOCUMENTS

| | | |
|---|---|---|
| 2001/0005172 A1 | 6/2001 | Miyashita et al. |
| 2005/0024601 A1 | 2/2005 | Morinaga |
| 2013/0114054 A1* | 5/2013 | Ishikawa ............... G03B 21/145 353/119 |
| 2014/0218693 A1* | 8/2014 | Kubo .................... G03B 21/16 353/57 |
| 2015/0268541 A1* | 9/2015 | Ishikawa ............... G03B 21/145 353/119 |
| 2018/0101089 A1* | 4/2018 | Hirayama ............. G03B 21/00 |

FOREIGN PATENT DOCUMENTS

| | | |
|---|---|---|
| JP | 2004-6360 A | 1/2004 |
| JP | 2005-43603 A | 2/2005 |
| JP | 2006-309096 A | 11/2006 |
| JP | 2006-337941 A | 12/2006 |
| JP | 2009-237237 A | 10/2009 |
| JP | 2010-266569 A | 11/2010 |
| JP | 2007-316318 A | 12/2017 |

OTHER PUBLICATIONS

International Search Report dated Apr. 4, 2017 in PCT/JP2017/004233 filed Feb. 6, 2017.

* cited by examiner

PROJECTOR

TECHNICAL FIELD

The present technology relates to a technical field of a projector that modulates light emitted from a light source by a modulator and projects an image.

CITATION LIST

Patent Literature

Patent Literature 1: Japanese Patent Application Laid-open No. 2006-309096
Patent Literature 2: Japanese Patent Application Laid-open No. 2006-337941

BACKGROUND ART

There is a projector that modulates light emitted from a light source by a modulator such as a liquid crystal panel and a DMD (digital micromirror device) element and projects the light modulated by the modulator as an image on a screen by a projection lens.

The projector includes an optical unit including an optical system including a modulator, a signal unit that sends a signal to the modulator, a light source block having a light source that emits light, and a power source unit that supplies electric power to the signal unit and a power source block for light source. In the projector, for example, light emitted from the light source is separated into red, green, and blue lights of wavelength bandwidths, and the lights of the respective wavelength bandwidths are modulated by the modulator, which is projected and superimposed on a screen to display a color image.

In the projector, a light source block can be replaced in order to improve maintainability (for example, see Patent Literature 1 and Patent Literature 2).

A projector described in Patent Literature 1 includes a light source block having a light source (burner) that emits light and a reflector to which the light source is attached, and the light source block is replaceable with respect to a lamp cooling device that cools the light source is improved.

Since the light source block is replaceable with respect to the lamp cooling device, the maintainability at the time of breakage of the light source.

Also, in the projector described in Patent Literature 1, the reflector is attached to the lamp cooling device, and a block that the light source, the reflector, and the lamp cooling device are integrated is replaceable with respect to the optical unit (optical engine body) having the modulator.

By replacing the block that the light source, the reflector, and the lamp cooling device are integrated is replaced with respect to the optical unit, the lamp cooling device where broken pieces of the burner remain is replaced together with the light source, it prevents the pieces from flying and the maintainability is further improved.

In the projector described in Patent Literature 2, a light source block including a light source that emits light and a control device (dichroic mirror or collimate lens) that control light emitted from the light source is arranged, and the light source block is replaceable with respect to an optical unit including a modulator.

Since an optical block including the light source and the control device is replaceable with respect to the optical unit, and the light source block having an optical axis between the light source and the control device adjusted in advance is replaced, the adjustment of the optical axis is unnecessary after the replacement, and the maintainability is improved.

DISCLOSURE OF INVENTION

Technical Problem

In the meantime, in the projector, an Ultra High Performance Lamp having a high light emitting efficiency in a visible light region is often used as the light source. In recent years, as the technology advances, other kinds of light sources such as a laser diode and a light emitting diode (LED) is brought into use.

The laser diode is coherent light characterized in that the emitted light has reduced variations in a wavelength or a amplitude, and exhibits less chromatic aberration upon light condensation by lens or the like. In addition, the laser diode has threshold current characteristics that in a case where a current having a specific current intensity flows, light is output. By increasing or decreasing the current around the threshold, it is possible to switch the light output with an extremely high sensitivity, and it is also possible to modulate at high wavelength regions.

Meanwhile, the light emitting diode advantageously has high reliability, a long life, and a high cost performance. In addition, the light emitting diode has low power consumption and less generates heat such that electric power is less converted into heat and less consumed and that a light emission efficiency is high. Furthermore, the light source of the light emitting diode is small such that a light emitting part can be downsized.

Under the above-mentioned circumstances, as Patent Literature 1 and Patent Literature 2 describe, it is necessary that light source block including the light source is replaceable to improve the maintainability. Furthermore, in the projector, it is desirable that a different kind of light source can be used corresponding to, for example, usage environment, an intended use, and the like to improve general versatility.

It is an object of the projector according to the present technology is to overcome the above-described problems and to improve general versatility by being capable of using a different kind of light source as well as to improve the maintainability.

Solution to Problem

First, in order to solve the above-described problems, a projector according to the present technology includes an optical unit including an optical system including a modulator; a signal unit that sends a signal to the modulator; a light source block including a light source that emits light, a lens that allows the light emitted from the light source to enter the optical unit, and a case including the light source inside; a power source block for light source that supplies electric power to the light source; a power source unit that supplies electric power to the signal unit and the power source block for light source; and an outer casing in which the optical unit, the signal unit, the power source unit, the light source block, and the power source block for light source are arranged, and the light source block is replaceable with a different kind of light source block including a different kind of light source.

With this structure, by replacing with a different kind of light source block, the different kind of light source can be used.

Second, in the projector according to the present technology, the power source block for light source may be desirably replaceable with a different kind of power source block for light source depending on the kind of light source block.

With this structure, it is replaced with the power source block for light source depending on the kind of light source block to be replaced.

Third, in the projector according to the present technology, the light source block and the power source block for light source may desirably form a light source unit, and the light source unit may be desirably replaceable with a different kind of light source unit.

With this structure, the light source block and the power source block for light source are replaced by one time operation.

Fourth, in the projector according to the present technology, a cooling mechanism including at least one cooling fan that generates cooling air may be desirably arranged, the case may desirably include a flow port at a position depending on the kind of light source, and the flow port flows the cooling air generated by the cooling fan inside and outside the light source block.

With this structure, the cooling air generated by the cooling fan flows inside and outside the light source block irrespective of the kind of the replaced light source block.

Fifth, in the projector according to the present technology, the flow port may be desirably formed at a position facing the cooling fan.

With this structure, the positions of the inflow port and the first cooling fan are matched at the time of replacement with the light source block.

Sixth, in the projector according to the present technology, the cooling fan may be desirably attached to the outer casing.

With this structure, since the cooling fan is not arranged in the light source block, the light source block is thereby light-weighted.

Seventh, in the projector according to the present technology, the light source block may desirably include a positioning part that positions the optical unit.

With this structure, at the time of replacement of the light source block, the light source block is positioned to the optical unit, and it ensures an appropriate positional relationship between the light source block and the optical unit.

Eighth, in the projector according to the present technology, the light source block may desirably include an engaging part that engages with the optical unit.

With this structure, the light source block is engaged with the optical unit by the engaging parts at the time of replacement of the light source block.

Ninth, in the projector according to the present technology, the positioning part and the engaging part may be desirably used in common.

With this structure, the light source block is positioned to the optical unit and the light source block is engaged with the optical unit by the engaging parts at the time of replacement of the light source block.

Advantageous Effects of Invention

According to the present technology, since it is possible to use the different kind of light source by replacing with the different kind of light source block, it is possible to improve general versatility.

It should be noted that the effects described here are not necessarily limitative and may be any of effects described in the present disclosure.

MODE(S) FOR CARRYING OUT THE INVENTION

Hereinafter, embodiments of a projector according to the present disclosure will be described with reference to the drawings.

In the following description, a projection direction is regarded as forward at a time of projecting an image by the projector, and directions of front, back, up, down, left, and right are shown. Note that the directions of front, back, up, down, left, and right are as a matter of description convenience. The embodiments of the present technology are not limited to these directions.

<Overall Structure of Projector>

Figure 1:
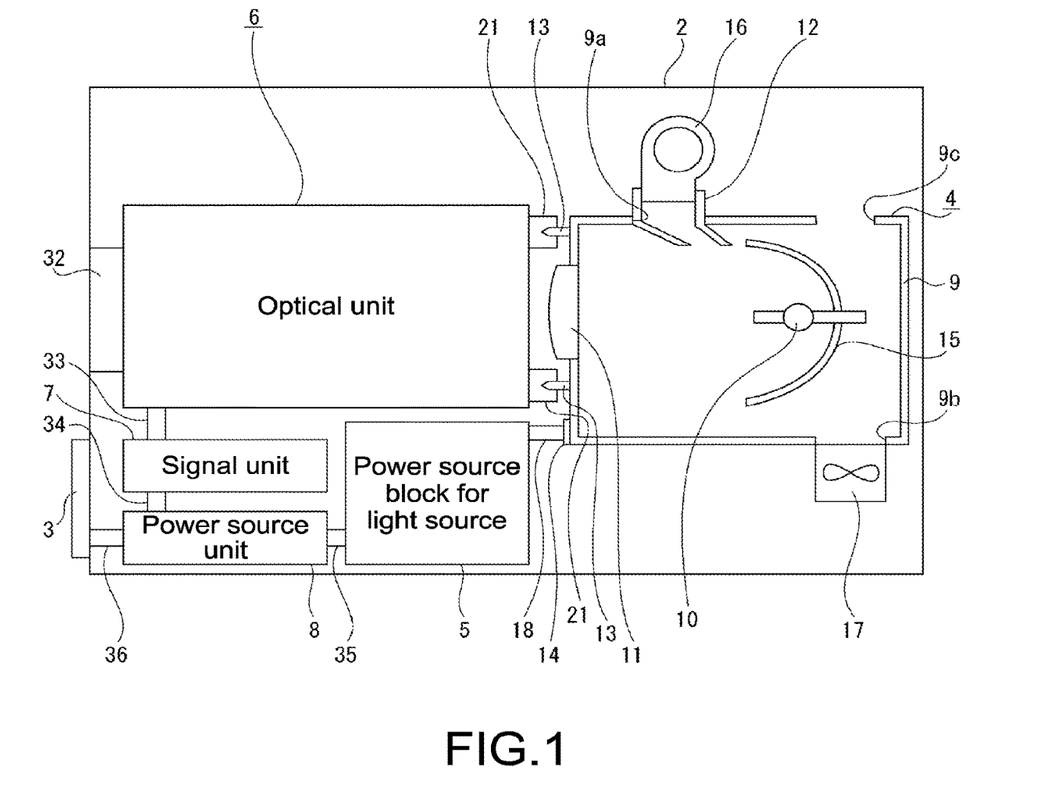
FIG. 1 shows an embodiment of the present technology projector together with FIGS. 2 to 10 and is a schematic diagram showing a structure of the projector.

A projector 1 includes an outer casing 2 where necessary respective components are arranged inside and outside (see FIG. 1). At an outer surface of the outer casing 2, a connection terminal 3 is arranged for power source supply. The connection terminal 3 is connected to an terminal of a power source cable (not shown) that is connected to a power source, and power is supplied to the connection terminal 3 from the power source via the power source cable.

The outer casing 2 includes a light source block 4, a power source block for light source 5, an optical unit 6, a signal unit 7, and a power source unit 8 inside.

Figure 2:
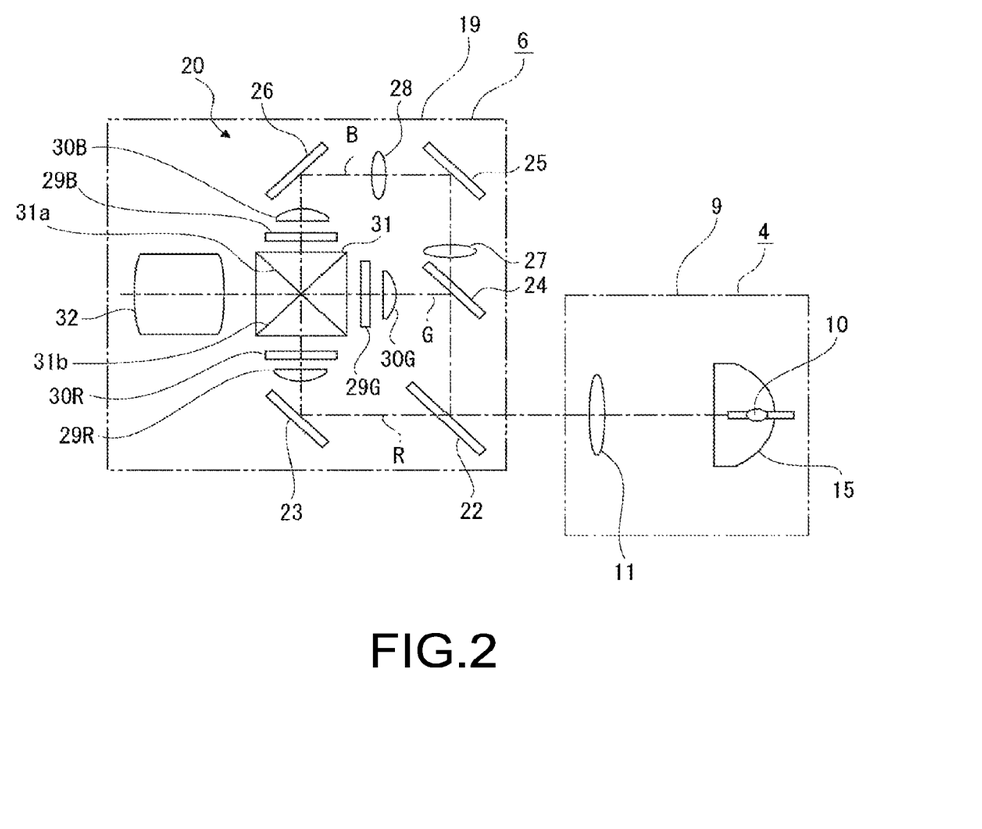
FIG. 2 is a schematic diagram showing a structure of an optical unit.

The light source block 4 includes a case 9, a light source 10, and a lens 11 (see FIGS. 1 and 2).

The case 9 is formed in a box shape such as a rectangular parallelepiped shape and a cube shape, for example. The case 9 includes an inflow port 9a and an outflow port 9b on the surfaces facing each other, for example. The case 9 includes an intake port 9c formed on the surface including the inflow port 9a, for example. The inflow port 9a, the outflow port 9b, and the intake port 9c function as flow ports that flow cooling air inside and outside the light source block 4.

A duct 12 that communicates inside and outside the case 9 is attached to an opening rim of the inflow port 9a of the case 9. The duct 12 is attached through the case 9 and is tilted so that a part protected inside the outer casing 2 faces to a light source 10 side.

At the front of the case 9, forward protruded positioning parts 13, 13 and a connector 14 are arranged.

Note that the case 9 may include engaging parts that are engaged with the optical unit 6, and the engaging parts and the positioning parts 13, 13 may be used in common. In a case where the engaging parts and the positioning parts 13, 13 are used in common, the positioning parts 13, 13 have both of a positioning function and an engaging function to the optical unit 6.

Alternatively, the positioning parts 13, 13 may position the outer casing 2, and the engaging parts may engage with the outer casing 2, respectively.

As the light source 10, an extra-high pressure mercury lamp is used, for example. A reflector 15 is arranged inside the case 9, and the light source 10 is attached to the reflector 15.

The lens 11 is, for example, a condensing lens or a collimate lens. The lens 11 is attached to the front of the case 9 and is positioned at the front of the light source 10.

A first cooling fan 16 and a second cooling fan 17 are arranged oppositely inside the outer casing across the light source block 4 (see FIG. 1). The first cooling fan 16 and the second cooling fan 17 form a cooling mechanism. The first cooling fan 16 is, for example, a sirocco fan, and the second cooling fan 17 is, for example, an axial-flow fan. The first cooling fan 16 is connected to the duct 12, and the second cooling fan 17 is positioned to cover the outflow port 9b of the case 9.

In the light source block 4 having the above-described structure, when light is emitted from the light source 10, the emitted light is reflected by the reflector 15, enters the lens 11, and travels from the lens 11 to the optical unit 6. At this time, the cooling air is intaken inside the case 9 by the first cooling fan 16 via the inflow port 9a, the light source 10 and the reflector 15 are cooled, and the cooling air having an increased temperature due to the cooling is ejected from the outflow port 9b by the second cooling fan 17. At the same time, air present inside the outer casing 2 is intaken inside the case 9 via the intake port 9c as the cooling air to cool the reflector 15, and the cooling air having an increased temperature due to the cooling is ejected from the outflow port 9b by the second cooling fan 17.

The power source block for light source 5 is connected to the connector 14 of the light source block 4 by a first connection part 18. The power source block for light source 5 has a function to supply a power source to the light source 10 of the light source block 4. Note that the first connection part 18 is a connection line of a flexible wiring board, a cable, or the like, and a second connection part 19 or subsequent one each is the connection line of a flexible wiring board, a cable, or the like, too.

The optical unit 6 includes a housing 19 and an optical system 20 (see FIGS. 1 and 2).

At back of the housing 19, alignment parts 21, 21 are arranged. The alignment parts 21, 21 are engaged with the positioning parts 13, 13 respectively so that the light source block 4 is positioned with respect to the optical unit 6. By positioning the light source block 4 to the optical unit 6, an optical axis of light source 10 is matched with an optical axis of the optical system 20.

Note that in a case where the engaging parts of the light source block 4 engage with the optical unit 6, the engaging parts of the light source block 4 engage with the optical unit 6. In addition, in a case where the positioning parts 13, 13 of the light source block 4 position the outer casing 2, the optical unit 6 has no alignment parts 21, 21, and is positioned and arranged to/on the outer casing 2 inside. Note that, also in this case, the positioning parts 13, 13 of the light source block 4 are positioned to the outer casing 2, the light source block 4 is positioned to the optical unit 6 via the outer casing 2, the optical axis of the light source 10 is matched with the optical axis of the optical system 20.

The optical system 20 includes a first dichroic mirror 22, a first reflection mirror 23, a second dichroic mirror 24, a second reflection mirror 25, and a third reflection mirror 26 arranged on each optical path, for example (see FIG. 2). A first relay lens 27 is arranged between the second dichroic mirror 24 and the second reflection mirror 25, and a second relay lens 28 is arranged between the second reflection mirror 25 and the third reflection mirror 26.

A first field lens 29R and a first modulator 30R are arranged on a red optical path R, a second field lens 29G and a second modulator 30G are arranged on a green optical path G, and a third field lens 29B and a third modulator 30B are arranged on a blue optical path B. A dichroic prism 31 is arranged at the position where the red optical path R, the green optical path G, and the blue optical path B are synthesized, and a projection lens 32 is arranged at the position facing the dichroic prism 31. The dichroic prism 31 includes a first control surface 31a and a second control surface 31b that reflect or transmit light, respectively. Each surface of the dichroic prism 31 is positioned facing the first modulator 30R, the second modulator 30G, and the third modulator 30B.

In the above-described optical system 20, in a case where light (white light) emitted from the light source 10 enters the first dichroic mirror 22 through the lens 11, a red component of the entered light is transmitted through the first dichroic mirror 22 and a green component and a blue component are reflected by the first dichroic mirror 22.

The red component transmitted through the first dichroic mirror 22 is reflected by the first reflection mirror 23, enters the first modulator 30R through the first field lens 29R, is modulated by the first modulator 30R, and enters the dichroic prism 31.

Meanwhile, the green component and the blue component reflected by the first dichroic mirror 22 enter the second dichroic mirror 24, the green component is reflected by the second dichroic mirror 24, and the blue component is transmitted through the second dichroic mirror 24.

The green component reflected by the second dichroic mirror 24 enters the second modulator 30G through the second field lens 29G, is modulated by the second modulator 30G, and enters the dichroic prism 31.

In addition, the blue component transmitted through the second dichroic mirror 24 is transmitted through the first relay lens 27, is reflected by the second reflection mirror 25, enters the third reflection mirror 26 through the second relay lens 28, is reflected by the third reflection mirror 26, enters the third modulator 30B through the third field lens 29B, is modulated by the third modulator 30B, and enters the dichroic prism 31.

The red component entered the dichroic prism 31 is reflected by the control surface 31a, the green component entered the dichroic prism 31 is transmitted through the first control surface 31a and the second control surface 31b, and the blue component entered the dichroic prism 31 is reflected by the second control surface 31b. The red component, the green component, and the blue component are reflected or transmitted at/through the first control surface 31a and the second control surface 31b, are synthesized, and are projected as a color image on a screen or the like (not shown) by the projection lens 32.

The first modulator 30R, the second modulator 30G, and the third modulator 30B of the optical unit 6 are connected to the signal unit 7 by a second connection part 33. The signal unit 7 has a function to send a predetermined signal to the first modulator 30R, the second modulator 30G, and the third modulator 30B, and perform a modulation control of the first modulator 30R, the second modulator 30G, and the third modulator 30B.

The signal unit 7 is connected to the power source unit 8 by a third connection part 34, the power source unit 8 is connected to the power source block for light source 5 by a fourth connection part 35. Thus, the power source unit 8 has a function to supply electric power to each of the signal unit 7 and the power source block for light source 5. In addition, the power source unit 8 is connected to the connection terminal 3 by a fifth connection part 36, and electric power is supplied to the power source unit 8 from the power source via a power source cable and the connection terminal 3.

Figure 3:
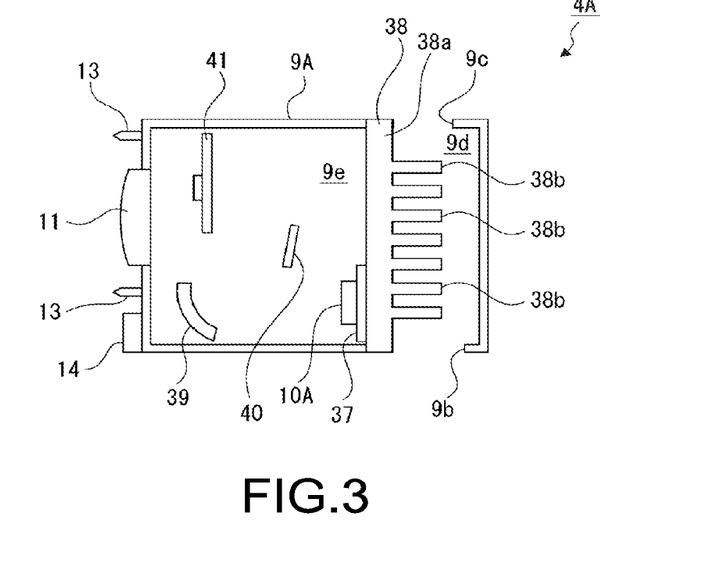
FIG. 3 is a schematic diagram showing a light source block using a laser diode as the light source.
Figure 4:
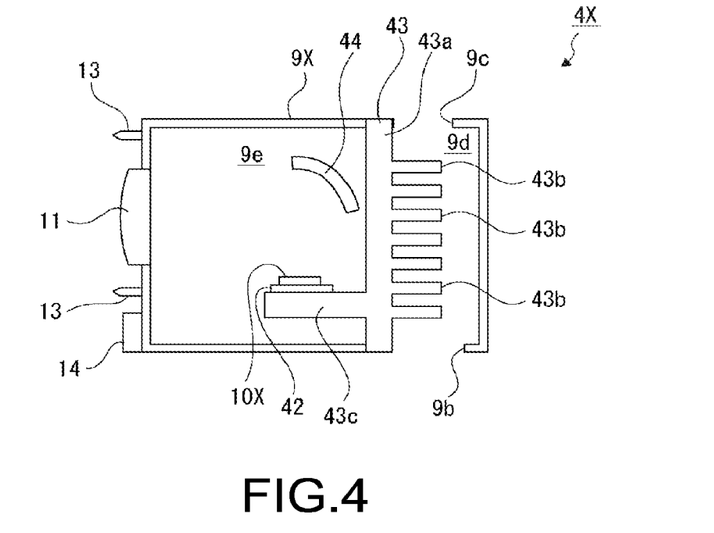
FIG. 4 is a schematic diagram showing the light source block using a light emitting diode as the light source.

In the projector 1 having the above-described structure, the light source block 4 is replaceable with a light source block 4A or a light source block 4X each having a different kind of light source (see FIGS. 3 and 4).

The light source block 4 can be taken out from the outer casing 2 by detaching the first connection part 18 from the connector 14, detaching the positioning parts 13, 13 from the alignment parts 21, 21, and by releasing the engaging parts.

Note that in the projector 1, in an opposite case where the light source block 4A is used, the light source block 4A is replaceable with the light source block 4 or the light source block 4X. In a case where the light source block 4X is used, the light source block 4X is replaceable with the light source block 4 or the light source block 4A.

Thus, in the projector 1, the light source block 4A or the light source block 4X are replaceable with the light source block 4. In the light source block 4, the inflow port 9a that functions as the flow port is formed at the position facing the first cooling fan 16 arranged in the outer casing 2.

Accordingly, since the positions of the inflow port 9a and the first cooling fan 16 are matched at the time of replacement with the light source block 4, a high cooling performance by the cooling mechanism to the light source block 4 is ensured without performing a positioning operation of the light source block 4 to the first cooling fan 16.

In addition, since the first cooling fan 16 and the second cooling fan 17 are attached to the outer casing 2 and are not arranged in the light source block 4, the light source block 4 is thereby light-weighted, and the operability can be improved at the time of replacement of the light source block 4.

The light source block 4A and the light source block 4X have the light sources 10A, 10X, respectively, being different from the light source 10, and are different kinds from the light source block 4.

The light source block 4A includes a case 9A, a light source 10A, and a lens 11 (see FIG. 3).

The case 9A is formed in a box shape such as a rectangular parallelepiped shape and a cube shape, for example. The case 9A includes an inflow port 9c and an outflow port 9b at ends of the surfaces facing each other, for example.

At the front of the case 9A, forward protruded positioning parts 13, 13 and a connector 14 are arranged.

Note that the case 9A may include engaging parts that are engaged with the optical unit 6, and the engaging parts and the positioning parts 13, 13 may be used in common. In a case where the engaging parts and the positioning parts 13, 13 are used in common, the positioning parts 13, 13 have both of a positioning function and an engaging function to the optical unit 6.

Alternatively, the positioning parts 13, 13 may position the outer casing 2 and the engaging parts may engage with the outer casing 2, respectively.

Note that a heavy heat sink is arranged on the light source block 4A as described later, and the total weight of the light source block 4A is likely to be heavier than the light source block 4. Accordingly, in the light source block 4A, in order to ensure a stable arrangement in the outer casing 2, it is desirable that the engaging parts are engaged with the outer casing 2.

As the light source 10A, a laser diode is used. The light source 10A is mounted on a substrate 37.

Inside the case 9A, a heat sink 38, a first reflection mirror 39, a second reflection mirror 40, and a wheel motor 41 are arranged.

The heat sink 38 includes a base 38a formed in the shape of a plate facing in the front-back direction and radiation fins 38b, 38b, . . . protruded from the base 38a backward, and ends of the radiation fins 38b, 38b, . . . are positioned forward of a rear surface of the case 9A. Accordingly, a space is formed between the rear surface and the base 38a in the case 9A, and the space is a radiation space 9d. As an inner space of the case 9A, a space forward of the base 38a is an arrangement space 9e. The arrangement space 9e is an enclosed space.

The intake port 9c and the outflow port 9b formed in the case 9A are communicated with the radiation space 9d. The substrate 37 on which the light source 10A is mounted is arranged on the base 38a of the heat sink 38.

The light source 10A, the substrate 37, the first reflection mirror 39, the second reflection mirror 40, and the wheel motor 41 are arranged in the arrangement space 9e.

The light source block 4A having the above-described structure is replaced by engaging with the positioning parts 13, 13 with the alignment parts 21, 21 of the housing 19 to be positioned to the optical unit 6 and engaging with the engaging parts with optical unit 6. Note that the light source block 4A may be replaced by positioning or engaging to/with the outer casing 2. In the state that light source block 4A is positioned and replaced, an optical axis of the light source 10A is matched with the optical axis of the optical system 20. In addition, the second cooling fan 17 is positioned to cover the outflow port 9b of the case 9A.

To the connector 14 of the replaced light source block 4A, the first connection part 18, the light source block 4A, and the power source block for light source 5 are connected.

In the light source block 4A having the above-described structure, blue light is emitted from the light source 10A, the emitted light is reflected by the first reflection mirror 39 and the second reflection mirror 40 in this order, is changed to white light by the rotation of the wheel motor 41, and the white light enters the lens 11 and travels from the lens 11 to the optical unit 6. When the light is emitted from the light source 10A, heat generated from the light source 10A and the substrate 37 is transferred to the heat sink 38, and is discharged from the heat sink 38 to the radiation space 9d.

At this time, air present inside the outer casing 2 is intaken inside the radiation space 9d via the intake port 9c as the cooling air, and the heat sink 38 is cooled. The cooling air having an increased temperature due to the cooling is ejected from the outflow port 9b by the second cooling fan 17.

Note that, similar to the light source block 4, the light source block 4A can be taken out from the outer casing 2 by detaching the first connection part 18 from the connector 14, detaching the positioning parts 13, 13 from the alignment parts 21, 21, and by releasing the engaging parts.

A light source block 4X includes a case 9X, a light source 10X, and the lens 11 (see FIG. 4).

The case 9X is formed in a box shape such as a rectangular parallelepiped shape and a cube shape, for example. The case 9X includes the inflow port 9c and the outflow port 9b at ends of the surfaces facing each other, for example.

At the front of the case 9X, forward protruded positioning parts 13, 13 and a connector 14 are arranged.

Note that the case 9X may include engaging parts that are engaged with the optical unit 6, and the engaging parts and the positioning parts 13, 13 may be used in common. In a case where the engaging parts and the positioning parts 13, 13 are used in common, the positioning parts 13, 13 have both of a positioning function and an engaging function to the optical unit 6.

Alternatively, the positioning parts 13, 13 may position the outer casing 2 and the engaging parts may engage with the outer casing 2, respectively.

Note that the heavy heat sink is arranged on the light source block 4X as described later, and the total weight of the light source block 4X is likely to be heavier than the light source block 4. Accordingly, in the light source block 4X, in order to ensure a stable arrangement in the outer casing 2, it is desirable that the engaging parts are engaged with the outer casing 2.

As the light source 10X, a light emitting diode is used. The light source 10X is mounted on a substrate 42.

Inside the case 9X, a heat sink 43 and a reflection mirror 44 are arranged.

The heat sink 43 includes a base 43a formed in the shape of a plate facing in the front-back direction, radiation fins 43b, 43b, . . . protruded from the base 43a backward, and a protruded arrangement 43c protruded forward from the base 43a, and ends of the radiation fins 43b, 43b, . . . are positioned forward of a rear surface of the case 9X. Accordingly, a space is formed between the rear surface and the base 43a in the case 9X, and the space is the radiation space 9d. As an inner space of the case 9X, a space forward of the base 43a is the arrangement space 9e. The arrangement space 9e is an enclosed space.

The intake port 9c and the outflow port 9b formed in the case 9X are communicated with the radiation space 9d. The substrate 42 on which the light source 10X is mounted is arranged on the protruded arrangement 43c of the heat sink 43.

The light source 10X, the substrate 42, and the reflection mirror 44 are arranged in the arrangement space 9e.

The light source block 4X having the above-described structure is replaced by engaging with the positioning parts 13, 13 with the alignment parts 21, 21 of the housing 19 to be positioned to the optical unit 6 and engaging with the engaging parts with optical unit 6. Note that the light source block 4X may be replaced by positioning or engaging to/with the outer casing 2. In the state that light source block 4X is positioned and replaced, an optical axis of the light source 10X is matched with the optical axis of the optical system 20. In addition, the second cooling fan 17 is positioned to cover the outflow port 9b of the case 9X.

To the connector 14 of the replaced light source block 4X, the first connection part 18, the light source block 4X, and the power source block for light source 5 are connected.

In the light source block 4X having the above-described structure, light (white light) is emitted from the light source 10X, the emitted light is reflected by the reflection mirror 44, enters the lens 11, and travels from the lens 11 to the optical unit 6. When the light is emitted from the light source 10X, heat generated from the light source 10X and the substrate 42 is transferred to the heat sink 43, and is discharged from the heat sink 43 to the radiation space 9d.

At this time, air present inside the outer casing 2 is intaken inside the radiation space 9d via the intake port 9c as the cooling air, and the heat sink 43 is cooled. The cooling air having an increased temperature due to the cooling is ejected from the outflow port 9b by the second cooling fan 17.

Note that, similar to the light source block 4, the light source block 4X can be taken out from the outer casing 2 by detaching the first connection part 18 from the connector 14, detaching the positioning parts 13, 13 from the alignment parts 21, 21, and by releasing the engaging parts.

In the above, it is illustrated that the light source blocks 4, 4A, and 4X are replaceable.

Alternatively, in the projector 1, the power source block for light source 5 may be replaceable.

For example, the light source block 4, the light source block 4A, and the light source block 4X include different kinds of light sources 10, 10A, and 10X, respectively. Supply control of electric power of the power source block for light source 5 to the light source 10, 10A, and 10X is different. Accordingly, on the assumption thereof, it is possible to replace with the power source block for light source 5 having a different supply control of electric power to the light source 10, 10A, and 10X according to the light source block 4, 4A, and 4X to be replaced.

In addition, the light source block 4A includes the wheel motor 41 that needs electric power supply. In a case where the light source block 4A is used in the projector 1, it needs the power source block for light source 5 having a circuit board that performs the electric power control of the wheel motor 41. Accordingly, also on the assumption thereof, it is possible to replace with the power source block for light source 5 having a different supply control of electric power according to the light source block 4, 4A, and 4X to be replaced.

Thus, it is possible to replace with the power source block for light source 5 depending on the kinds of the light source block 4. Since the power source block for light source 5 is replaced according to the light source block 4, 4A, and 4X to be replaced, it can assure an appropriate operation status in relation to the replaced light source block 4, 4A, and 4X.

Figure 5:
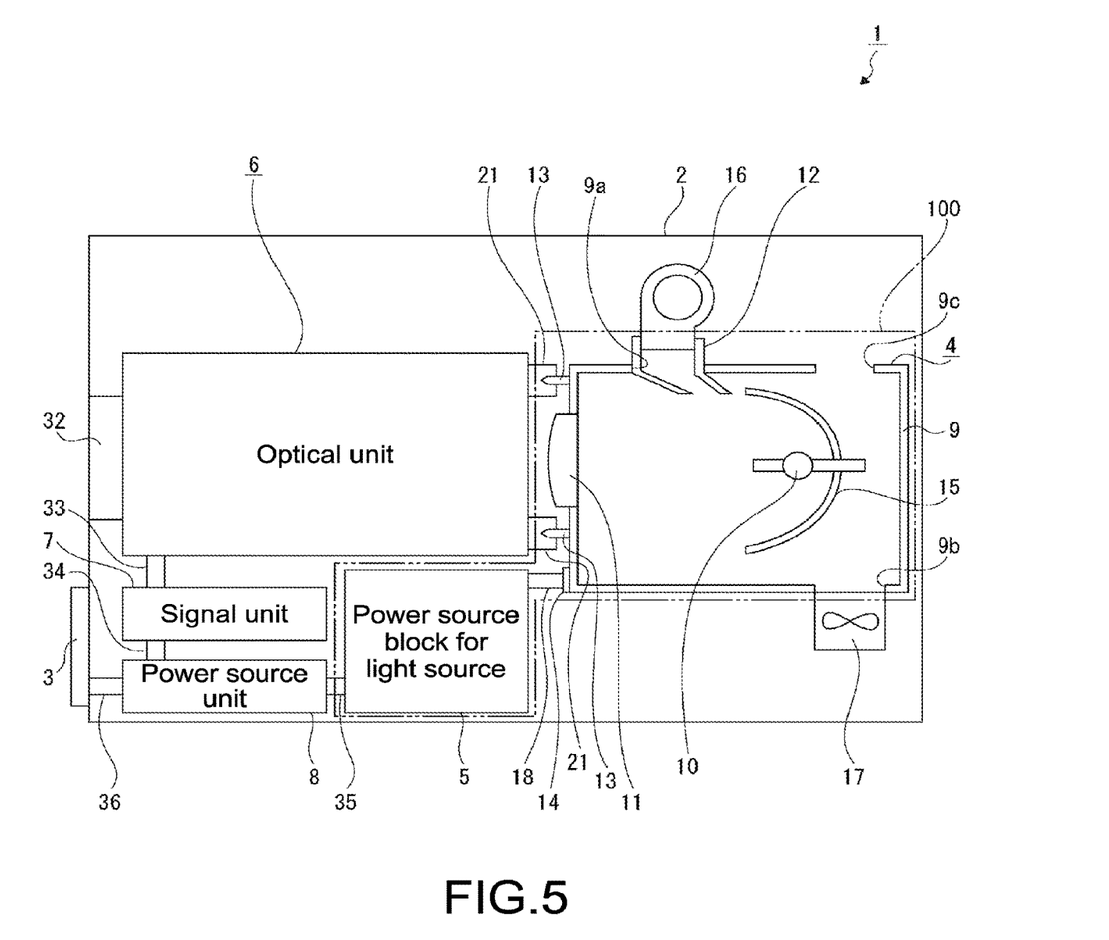
FIG. 5 is a schematic diagram showing a structure of the projector including the light source unit.

Furthermore, in the projector 1, the light source block 4 (light source block 4A, light source block 4X) and the power source block for light source 5 are arranged as the light source unit 100, and the light source unit 100 may be replaceable (see FIG. 5).

Thus, since the light source unit 100 where the light source block 4 and the power source block for light source 5 are integrated is replaceable, the light source block 4 and the power source block for light source 5 are replaced by one time operation. As a result, the light source block 4 can be easily replaced, and it can assure an appropriate operation status in relation to the replaced light source block 4.

Note that, in the projector 1, an opening for replacing the light source block 4, the power source block for light source 5, or light source unit 100 may be formed in the outer casing 2, and the opening may be closed by an openable and closeable cover (not shown). By arranging the cover and detaching the cover from the outer casing 2, it is possible to replace the light source block 4, the power source block for light source 5, or the light source unit 100, and a replacement operation can be easily and speedily performed. In addition, with the opening being closed by the cover, it is possible to prevent dust from entering into the outer casing 2.

In addition, the outer casing 2 may include a louver that can change a flowing direction of the cooling air. By including the louver, the direction of the louver is changed depending on the replaced light source blocks 4, 4A, and 4X, and it is possible to change the flowing direction of the cooling air. It is possible to cool a necessary site depending on the kinds of the replaced light source blocks 4, 4A, and 4X and improve cooling efficiency.

Furthermore, a switch operated by the light source block 4, 4A, and 4X to be replaced or a detector that detects the light source blocks 4, 4A, and 4X may be included. By including the switch and the detector, it is possible to automatically change the direction of the louver depending on an operation status of the switch and a detection result by the detector and to automatically adjust an cooling degree by the cooling mechanism, it can assure an optimal cooling status for the replaced light source blocks 4, 4A, and 4X.

<Alternative Embodiments of Light Source Block>

Hereinafter, alternative embodiments of the light source block 4A and the light source block 4X will be described (see FIGS. 6 to 10).

Note that as the light source blocks 4B, 4C, 4D, 4E, and 4Y according to alternative embodiments shown below are different from the light source blocks 4A and 4X only in that the structure of the case and the internal structure are different, configurations different from the light source blocks 4A and 4X will be described in detail, other configurations are denoted by the similar reference signs of the light source blocks 4A an 4X, and description thereof will be omitted.

Figure 6:
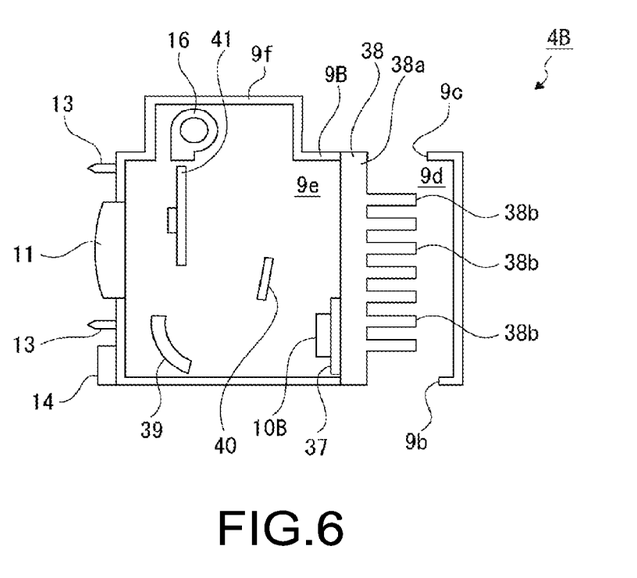
FIG. 6 shows an alternative embodiment of the light source block using a laser diode as the light source together with FIGS. 7 to 9 and is a schematic diagram showing a structure of a first alternative embodiment.

A light source block 4B according to a first alternative embodiment of the light source block 4A includes a case 9B, a light source 10B, and the lens 11 (see FIG. 6).

One part of the case 9B is protruded from the other parts and forms a fan arrangement 9f. The fan arrangement 9f includes the first cooling fan 16. Accordingly, in a case where the light source block 4B is used, the first cooling fan 16 is not arranged outside the light source block 4B in advance.

As the light source 10B, a laser diode is used. The light source 10B is mounted on the substrate 37.

Inside the case 9B, the heat sink 38, the first reflection mirror 39, the second reflection mirror 40, and the wheel motor 41 are arranged. The arrangement space 9e of the case 9B is an enclosed space.

In the light source block 4B having the above-described structure, blue light is emitted from the light source 10B, the emitted light is reflected by the first reflection mirror 39 and the second reflection mirror 40 in this order, is changed to white light by the rotation of the wheel motor 41, and the white light enters the lens 11 and travels from the lens 11 to the optical unit 6. When the light is emitted from the light source 10B, heat generated from the light source 10B and the substrate 37 is transferred to the heat sink 38, and is discharged from the heat sink 38 to the radiation space 9d.

At this time, air present inside the outer casing 2 is intaken inside the radiation space 9d via the intake port 9c as the cooling air, and the heat sink 38 is cooled. The cooling air having an increased temperature due to the cooling is ejected from the outflow port 9b by the second cooling fan 17. In addition, air present inside the case 9B is circulated by convection in the arrangement space 9e by the first cooling fan 16. The circulated air forms the cooling air to cool the wheel motor 41 or the like.

As described above, in the light source block 4B, since the arrangement space 9e of the case 9B is the enclosed space, dust and moisture are prevented from entering the arrangement space 9e so as to prevent dust and moisture from attaching to each component arranged in the arrangement space 9e.

Also, in the light source block 4B, the first cooling fan 16 is positioned near the wheel motor 41. The wheel motor 41 having the increased temperature upon driving can be sufficiently cooled by the cooling air generated by the first cooling fan 16.

Figure 7:
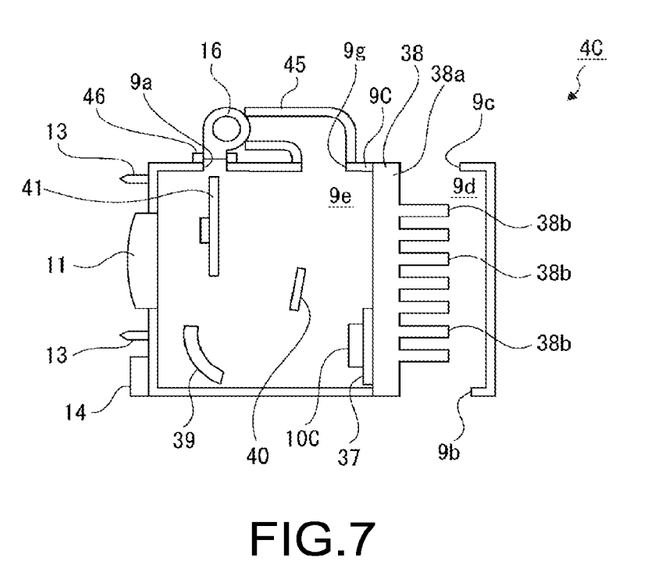
FIG. 7 is a schematic diagram showing a structure of a second alternative embodiment.

A light source block 4C according to a second alternative embodiment of the light source block 4A includes a case 9C, a light source 10C, and the lens 11 (see FIG. 7).

The case 9C is formed in a box shape such as a rectangular parallelepiped shape and a cube shape, for example. The case 9C includes the inflow port 9a and a circulation port 9g at the same surface, for example.

As the light source 10C, a laser diode is used.

Inside the case 9C, the heat sink 38, the first reflection mirror 39, the second reflection mirror 40, and a wheel motor 41 are arranged.

At an outer surface side of the case 9C, a duct 45 and a duct 46 are arranged. One end of the duct 45 is connected to the intake port of the first cooling fan 16 and the other end is communicated with the circulation port 9g. One end of the duct 46 is connected to a blast port of the first cooling fan 16 and the other end is communicated with the inflow port 9a. Accordingly, the inflow port 9a and the circulation port 9g formed in the case 9C are communicated with each other via the duct 45, the first cooling fan 16, and the duct 46.

In the light source block 4C having the above-described structure, blue light is emitted from the light source 10C, the emitted light is reflected by the first reflection mirror 39 and the second reflection mirror 40 in this order, is changed to white light by the rotation of the wheel motor 41, and the white light enters the lens 11 and travels from the lens 11 to the optical unit 6. When the light is emitted from the light source 10C, heat generated from the light source 10B and the substrate 37 is transferred to the heat sink 38, and is discharged from the heat sink 38 to the radiation space 9d.

At this time, air present inside the outer casing 2 is intaken inside the radiation space 9d via the intake port 9c as the cooling air, and the heat sink 38 is cooled. The cooling air having an increased temperature due to the cooling is ejected from the outflow port 9b by the second cooling fan 17. In addition, air present inside the case 9C is circulated by convection in the arrangement space 9e and the duct 45 by the first cooling fan 16. The circulated air forms the cooling air to cool the wheel motor 41 or the like.

As described above, in the light source block 4C, since the air present inside the case 9C is circulated in the arrangement space 9e, the duct 45, and the duct 46, dust and moisture are prevented from entering the arrangement space 9e so as to prevent dust and moisture from attaching to each component arranged in the arrangement space 9e.

Also, in the light source block 4C, the inflow port 9a is positioned near the wheel motor 41. The wheel motor 41 having the increased temperature upon driving can be sufficiently cooled by the cooling air generated by the first cooling fan 16.

Furthermore, in the light source block 4C, the inflow port 9a that functions as the flow port is formed at the position facing the first cooling fan 16 arranged in the outer casing 2.

Accordingly, since the positions of the inflow port 9a and the first cooling fan 16 are matched at the time of replacement with the light source block 4C, a high cooling performance by the cooling mechanism to the light source block 4C is ensured without performing a positioning operation of the light source block 4 to the first cooling fan 16.

Figure 8:
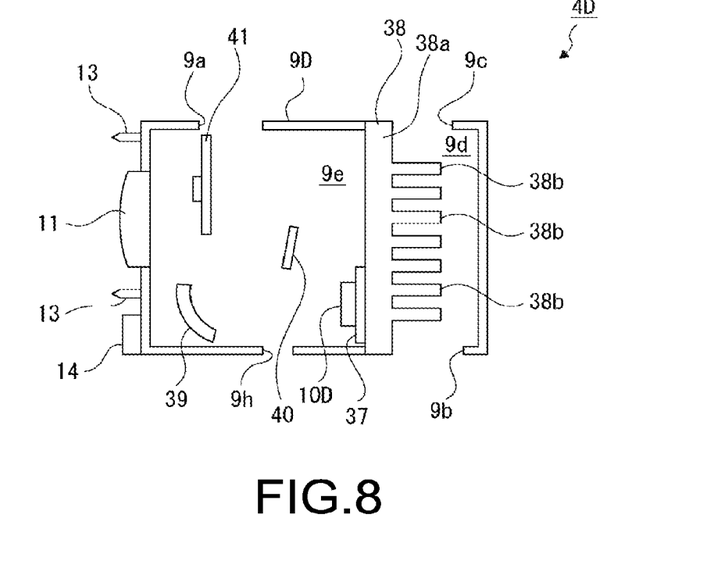
FIG. 8 is a schematic diagram showing a structure of a third alternative embodiment.

A light source block 4D according to a third alternative embodiment of the light source block 4A includes a case 9D, a light source 10D, and the lens 11 (see FIG. 8).

The case 9D is formed in a box shape such as a rectangular parallelepiped shape and a cube shape, for example. The case 9D includes the inflow port 9a and a ventilation port 9h formed on the surfaces facing each other, for example.

As the light source 10D, a laser diode is used.

Inside the case 9D, the heat sink 38, the first reflection mirror 39, the second reflection mirror 40, and a wheel motor 41 are arranged.

In the light source block 4D having the above-described structure, blue light is emitted from the light source 10D, the emitted light is reflected by the first reflection mirror 39 and the second reflection mirror 40 in this order, is changed to white light by the rotation of the wheel motor 41, and the white light enters the lens 11 and travels from the lens 11 to the optical unit 6. When the light is emitted from the light source 10D, heat generated from the light source 10D and the substrate 37 is transferred to the heat sink 38, and is discharged from the heat sink 38 to the radiation space 9d.

At this time, air present inside the outer casing 2 is intaken inside the radiation space 9d via the intake port 9c as the cooling air, and the heat sink 38 is cooled. The cooling air having an increased temperature due to the cooling is ejected from the outflow port 9b by the second cooling fan 17. In addition, the cooling air is intaken inside the case 9D by the first cooling fan 16 via the inflow port 9a, the respective components arranged in the arrangement space 9e are cooled, and the cooling air having an increased temperature due to the cooling is ejected from the ventilation port 9h.

Accordingly, in the light source block 4D, since the cooling air is intaken inside the case 9D by the first cooling fan 16 and the respective components arranged in the arrangement space 9e are cooled, a high cooling performance to the respective components arranged inside the case 9D is ensured.

In particular, in the light source block 4D, since the inflow port 9a is positioned near the wheel motor 41, the wheel motor 41 having the increased temperature upon driving can be sufficiently cooled by the cooling air generated by the first cooling fan 16.

In the light source block 4D, the inflow port 9a that functions as the flow port is formed at the position facing the first cooling fan 16 arranged in the outer casing 2.

Accordingly, since the positions of the inflow port 9a and the first cooling fan 16 are matched at the time of replacement with the light source block 4D, a high cooling performance by the cooling mechanism to the light source block 4D is ensured without performing a positioning operation of the light source block 4 to the first cooling fan 16.

Figure 9:
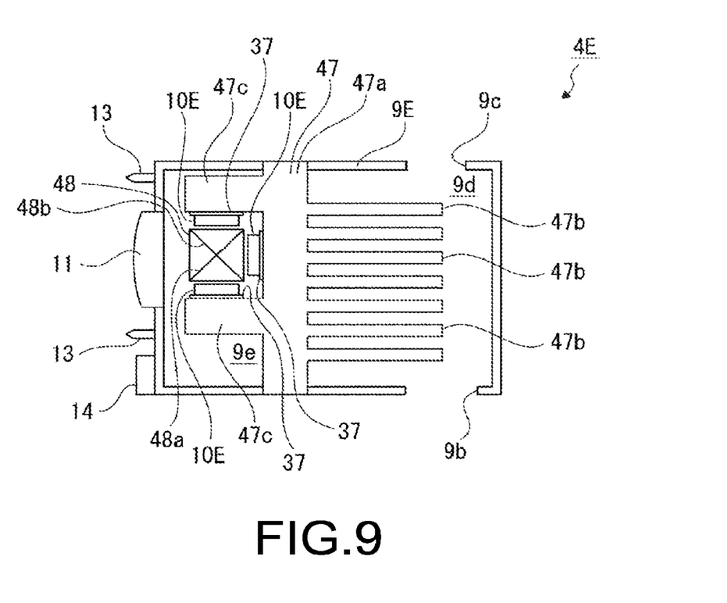
FIG. 9 is a schematic diagram showing a structure of a fourth alternative embodiment.

A light source block 4E according to a fourth alternative embodiment of the light source block 4A includes a case 9E, a light sources 10E, 10E, 10E, and the lens 11 (see FIG. 9).

The case 9E is formed in a box shape such as a rectangular parallelepiped shape and a cube shape, for example.

As the light sources 10E, 10E, 10E, laser diodes are used. The light sources 10E, 10E, 10E emit red light, green light, and blue light, respectively. The light sources 10E, 10E, 10E are mounted on the substrates 37, 37, 37, respectively.

Inside the case 9E, a heat sink 47 is arranged, no first reflection mirror 39, no second reflection mirror 40, no wheel motor 41 are arranged.

The heat sink 47 includes a base 47a formed in the shape of a plate facing in the front-back direction and radiation fins 47b, 47b, . . . protruded from the base 47a backward, and ends of the radiation fins 47b, 47b, . . . are positioned forward of a rear surface of the case 9E.

The substrates 37, 37, 37 on which the light sources 10E, 10E, 10E are mounted are arranged on the base 47a, and protruded arrangements 47c, 47c of the heat sink 38, respectively.

A dichroic prism 48 is arranged in the arrangement space 9e backward of the lens 11. Respective three faces of the dichroic prism 48 are closely positioned facing the light sources 10E, 10E, 10E. The dichroic prism 48 has a first control surface 48a and a second control surface 48b that reflects or transmits light, respectively. The arrangement space 9e is an enclosed space.

In the light source block 4E having the above-described structure, in a case where red light, green light, and blue light are emitted from the light sources 10E, 10E, 10E, the emitted light each enters the dichroic prism 48. The red light is reflected by the first control surface 48a, the green light is transmitted through the first control surface 48a and the second control surface 48b, and the blue light is reflected by the second control surface 48b. The red light, the green light, and the blue light are reflected or transmitted at/through the first control surface 48a and the second control surface 48b, are synthesized, and travel from the lens 11 to the optical unit 6. When the light is emitted from the light sources 10E, 10E, 10E, heat generated from the light sources 10E, 10E, 10E and the substrates 37, 37, 37 is transferred to the heat sink 47, and is discharged from the heat sink 47 to the radiation space 9d.

At this time, air present inside the outer casing 2 is intaken inside the radiation space 9d via the intake port 9c as the cooling air, and the heat sink 47 is cooled. The cooling air having an increased temperature due to the cooling is ejected from the outflow port 9b by the second cooling fan 17.

Thus, since the dichroic prism 48 is arranged and no first reflection mirror 39, no second reflection mirror 40, and no wheel motor 41 are arranged in the light source block 4E, the number of components is decreased and the manufacturing costs can be reduced.

In addition, since no first reflection mirror 39, no second reflection mirror 40, and no wheel motor 41 are arranged, the size of the arrangement space 9e can be decreased, the length of each of radiation fins 47b, 47b, . . . of the heat sink 47 can be increased, and a radiation surface area can be increased, to thereby assure high radiation properties.

Figure 10:
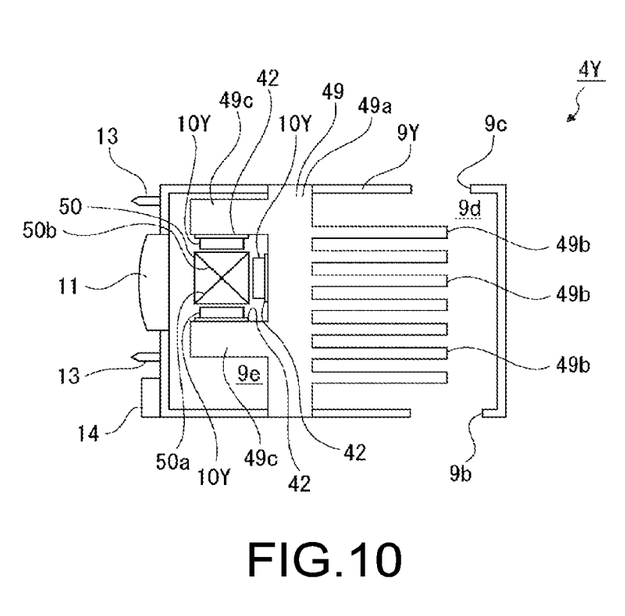
FIG. 10 is a schematic diagram showing a structure of an alternative embodiment of the light source block using the light emitting diode as the light source.

A light source block 4Y according to a first alternative embodiment of the light source block 4X includes a case 9Y, a light sources 10Y, 10Y, 10Y, and the lens 11 (see FIG. 10).

The case 9Y is formed in a box shape such as a rectangular parallelepiped shape and a cube shape, for example.

As the light sources 10Y, 10Y, 10Y, a light emitting diodes are used. The light sources 10Y, 10Y, 10Y emit red light, green light, and blue light, respectively. The light sources 10Y, 10Y, 10Y are mounted on the substrates 42, 42, 42, respectively.

Inside the case 9Y, a heat sink 49 is arranged, no reflection mirror 44 is arranged.

The heat sink 49 includes a base 49a formed in the shape of a plate facing in the front-back direction and radiation fins 49b, 49b, . . . protruded from the base 49a backward, and ends of the radiation fins 49b, 49b, . . . are positioned forward of a rear surface of the case 9Y.

The substrates 42, 42, 42 on which the light sources 10Y, 10Y, 10Y are mounted are arranged on the base 49a, and protruded arrangements 49c, 49c of the heat sink 39, respectively.

A dichroic prism 50 is arranged in the arrangement space 9e backward of the lens 11. Respective three faces of the dichroic prism 50 are closely positioned facing the light sources 10Y, 10Y, 10Y. The dichroic prism 50 has a first control surface 50a and a second control surface 50b that reflects or transmits light, respectively. The arrangement space 9e is an enclosed space.

In the light source block 4Y having the above-described structure, in a case where red light, green light, and blue light are emitted from the light sources 10Y, 10Y, 10Y, the emitted light each enters the dichroic prism 50. The red light is reflected by the first control surface 50a, the green light is transmitted through the first control surface 50a and the second control surface 50b, and the blue light is reflected by the second control surface 50b. The red light, the green light, and the blue light are reflected or transmitted at/through the first control surface 50a and the second control surface 50b, are synthesized, and travel from the lens 11 to the optical unit 6. When the light is emitted from the light sources 10Y, 10Y, 10Y, heat generated from the light sources 10Y, 10Y, 10Y and the substrates 42, 42, 42 is transferred to the heat sink 49, and is discharged from the heat sink 49 to the radiation space 9d.

At this time, air present inside the outer casing 2 is intaken inside the radiation space 9d via the intake port 9c as the cooling air, and the heat sink 49 is cooled. The cooling air having an increased temperature due to the cooling is ejected from the outflow port 9b by the second cooling fan 17.

Thus, since the dichroic prism 50 is arranged and no reflection mirror 44 is arranged in the light source block 4Y, the size of the arrangement space 9e can be decreased, the length of each of radiation fins 49b, 49b, . . . of the heat sink 49 can be increased, and a radiation surface area can be increased, to thereby assure high radiation properties.

<Summary>

As described above, in the projector 1, the light source block 4 (the same applies to 4A, 4B, 4C, 4D, 4E, 4X, and 4Y) is replaceable with a different kind of light source block including the light source 10 (the same applies to 10A, 10B, 10C, 10D, 10E, 10X, and 10Y).

Accordingly, since it is possible to use a different kind of light source 10 by replacing with a different kind of light source block 4, it is possible to improve general versatility.

In addition, there is provided a cooling mechanism at least one of the first cooling fan 16 or the second cooling fan 17 that generates the cooling air and the flow port (inflow port 9a, outflow port 9b, intake port 9c, circulation port 9g, and ventilation port 9h) that flows the cooling air inside and outside the light source block 4 at the position corresponding to the type of the light source 10 is formed in the case 9 (9A, 9B, 9C, 9D, 9E, 9X, 9Y).

Accordingly, since the cooling air generated by the first cooling fan 16 or the second cooling fan 17 flows inside and outside the light source block 4 irrespective of the kind of the replaced light source block 4, the light source block 4 can be cooled by flowing the cooling air to necessary parts irrespective of the kind of the light source block 4.

Furthermore, the light source block 4 includes the positioning parts 13, 13 that position the optical unit 6. Accordingly, at the time of replacement of the light source block 4, the light source block 4 is positioned to the optical unit 6. Thus, it easily ensures an appropriate positional relationship between the light source block 4 and the optical unit 6, and the projector 1 can be appropriately operated irrespective of the kind of the replaced light source block 4.

In addition, in a case where the light source block 4 includes the engaging parts that are engaged to the optical unit 6, the light source block 4 is engaged with the optical unit 6 by the engaging parts at the time of replacement of the light source block 4. Thus, the light source block 4 can be easily attached to the optical unit 6 irrespective of the kind of the replaced light source block 4.

In addition, in a case where the positioning parts 13, 13 and the engaging parts are used in common, the light source block 4 is positioned to the optical unit 6 and the light source block 4 is engaged with the optical unit 6 by the engaging parts at the time of replacement of the light source block 4. Thus, the light source block 4 can have a simplified structure irrespective of the kind of the light source block 4.

Note that, in the above, it is described that the light source blocks 4, 4A, 4B, 4C, 4D, 4E, 4X, 4Y are replaced each other. In the projector 1, it is possible to replace the same kind of the light source blocks 4, the power source blocks for light source 5, or the light source units 100. For example, it is possible to replace the light source block 4 with a new light source block 4, or the light source block 4A with a new light source block 4A.

<Present Technology>

The present technology may have the following structures.

(1)

A projector, including:

an optical unit including an optical system including a modulator;

a signal unit that sends a signal to the modulator;

a light source block including a light source that emits light, a lens that allows the light emitted from the light source to enter the optical unit, and a case including the light source inside;

a power source block for light source that supplies electric power to the light source;

a power source unit that supplies electric power to the signal unit and the power source block for light source; and an outer casing in which the optical unit, the signal unit, the power source unit, the light source block, and the power source block for light source are arranged, the light source block replaceable with a different kind of light source block including a different kind of light source.

(2)

The projector according to (1), in which the power source block for light source is replaceable with a with a different kind of power source block for light source depending on the kind of light source block.

(3)

The projector according to (1), in which the light source block and the power source block for light source form a light source unit, and the light source unit is replaceable with a different kind of light source unit.

(4)

The projector according to (1) to (3), further including:

a cooling mechanism including at least one cooling fan that generates cooling air, in which the case includes a flow port at a position depending on the kind of light source, the flow port flowing the cooling air generated by the cooling fan inside and outside the light source block.

(5)

The projector according to (4), in which the flow port is formed at a position facing the cooling fan.

(6)

The projector according to (4) or (5), in which the cooling fan is attached to the outer casing.

(7)

The projector according to any one of (1) to (6) 1, in which the light source block includes a positioning part that positions the optical unit.

(8)

The projector according to (7), in which the light source block includes an engaging part that engages with the optical unit.

(9)

The projector according to (8), in which the positioning part and the engaging part are used in common.

REFERENCE SIGNS LIST 1 projector
2 outer casing
4 light source block
5 power source block for light source
6 optical unit
7 signal unit
8 power source unit
9 case
9a inflow port (flow port)
9b outflow port (flow port)
9c intake port (flow port)
10 light source
11 lens
13 positioning part
16 first cooling fan
17 second cooling fan
20 optical system
30R first modulator
30G second modulator
30B third modulator
4A light source block
9A case
10A light source
4X light source block
9X case
10X light source
100 light source unit
4B light source block
9B case
10B light source
4C light source block
9C case
9g circulation port (flow port)
10C light source
4D light source block
9D case
9h ventilation port (flow port)
10D light source
4E light source block
9E case
10E light source
4Y light source block
9Y case
10Y light source

The invention claimed is:

1. A projector, comprising:
   an optical unit including an optical system including a modulator;
   a signal unit that sends a signal to the modulator;
   a light source block including a light source that emits light, a lens that allows the light emitted from the light source to enter the optical unit, and a case including the light source inside;
   a power source block for light source that supplies electric power to the light source;
   a power source unit that supplies electric power to the signal unit and the power source block for light source;
   an outer casing in which the optical unit, the signal unit, the power source unit, the light source block, and the power source block for light source are arranged; and
   a cooling mechanism including at least one cooling fan that generates cooling air, wherein
   the case includes a flow port at a position depending on the kind of light source, the flow port flowing the cooling air generated by the cooling fan inside and outside the light source block,
   the outer casing includes a cooling air directional control device to change a flowing direction of the cooling air depending on the kind of light source, and
   wherein the light source block is replaceable with a different kind of light source block including a different kind of light source.

2. The projector according to claim 1, wherein the power source block for light source is replaceable with a with a different kind of power source block for light source depending on the kind of light source block.

3. The projector according to claim 1, wherein the light source block and the power source block for light source form a light source unit, and
   wherein the light source unit is replaceable with a different kind of light source unit.

4. The projector according to claim 1, wherein the flow port is formed at a position facing the cooling fan.

5. The projector according to claim 1, wherein the cooling fan is attached to the outer casing.

6. The projector according to claim 1, wherein the light source block includes a positioning part that positions the optical unit.

7. The projector according to claim 6, wherein the light source block includes an engaging part that engages with the optical unit.

8. The projector according to claim 7, wherein the positioning part and the engaging part are used in common.

* * * * *